United States Patent [19]

Ohtsuka et al.

[11] Patent Number: 4,962,432
[45] Date of Patent: Oct. 9, 1990

[54] SELECTIVE RETRIEVAL OF DATA FROM MICROFILM IMAGES OF DIFFERENT FORMS BY READING A MEMORY INDEX FORM CORD (BAR CODE) RECORDED ON EACH IMAGE FRAME

[75] Inventors: Shuichi Ohtsuka; Keiichi Yamana, both of Kanagawa, Japan

[73] Assignee: Fuji Photo Film Co., Ltd., Kanagawa, Japan

[21] Appl. No.: 344,731

[22] Filed: Apr. 28, 1989

[30] Foreign Application Priority Data

Apr. 30, 1988 [JP] Japan .................. 63-107935
Apr. 30, 1988 [JP] Japan .................. 63-107937
Aug. 15, 1988 [JP] Japan .................. 63-201914
Aug. 15, 1988 [JP] Japan .................. 63-201915
Aug. 15, 1988 [JP] Japan .................. 63-201916

[51] Int. Cl.$^5$ ............... H04N 1/23; G01D 15/14; G03B 23/12
[52] U.S. Cl. .................................. 358/302; 346/108; 353/26 A
[58] Field of Search .............. 355/41; 353/25, 26 A, 353/27 A, 26 R, 27 R; 346/107 R, 108, 76 L; 358/296, 302; 235/462

[56] References Cited

U.S. PATENT DOCUMENTS

| | | | |
|---|---|---|---|
| 4,174,891 | 11/1979 | Flint | 353/26 A |
| 4,179,743 | 12/1979 | Suzuki | 353/27 A |
| 4,283,621 | 8/1981 | Pembroke | 353/26 A |
| 4,669,838 | 6/1987 | Hibbard | 353/26 A |
| 4,862,222 | 8/1989 | Staude | 355/41 |

FOREIGN PATENT DOCUMENTS 63-36034 6/1988 Japan .
63-27751 7/1988 Japan .

Primary Examiner—Bruce A. Reynolds
Assistant Examiner—Scott Rogers
Attorney, Agent, or Firm—Sughrue, Mion, Zinn, Macpeak & Seas

[57] ABSTRACT

A system for recording and reading an image information wherein an image containing a certain form and data is recorded on each frame of a microfilm and a desired datum is selected and read from the microfilm. The system comprises a printer for printing a form cord for discriminating the form style recorded on each frame of the microfilm, and a reader for reading the form cord and reading-out the corresponding form style from a form memory to determine the position of the desired datum so that the desired datum is extracted from the printed image. The form cord preferably includes information relating to the kind, fount, size and pitch of letters in addition to the information relating to the form style. The form cord may be printed on each frame of the microfilm preferably in the form of bar cord with or without data cords and check cords. Data cords may be attached to respective data or may be printed collectively at a certain location on each frame of the microfilm. Also provided are a printer, a reader and a microfilm used in the system.

22 Claims, 15 Drawing Sheets

FIG.1

| 記号 | 番 | | 号 | | 令 | | 新契約番号 | | |
|---|---|---|---|---|---|---|---|---|---|
| 350 | 1509225 | | | | 34 | 0640801 | | 0015 | 051 |
| 商品 | 特1 | | 特2 | | | 特3 | 特4 | | 特5 |
| 05 | 診 61 | 1 | 0900 | 0500 | | 0000 | 0300 | | 100 |
| 被生年月日 | | 保険料 | | | 払料 | 性 | | | 死亡 S |
| 47 04.09 | | 13382 | | | 9 1 | 1 | | | 150000 |
| 契 | | 名 | | | | | 被 | | 名 |
| オオツカ ショウイチ | | | | | | | ヤマナ ケイイチ | | |

FIG.1A

| CODE NUMBER | | | AGE | NEW CONTRACT NUMBER | | | | |
|---|---|---|---|---|---|---|---|---|
| 350 | 1509225 | | 34 | 0640801 | | 0015 | | 051 |
| ITEM | DIAG-NOSIS | SP. CONTRACT 1 | SP. CONTRACT 2 | SP. CONTRACT 3 | SP. CONTRACT 4 | | SP. CONTRACT 5 | |
| 05 | 61 | 1 | 0900 | 0500 | 0000 | 0300 | | 100 |
| DATE OF BIRTH | | PREMIUM | PAYMENT | FEE | SEX | DEATH OF BENEFIT | | |
| 4704.09 | | 133382 | 9 | 1 | 1 | 150000 | | |
| NAME OF THE PERSON TO CONTRACT | | | | NAME OF THE INSURED | | | | |
| SHUICHI OHTSUKA | | | | KEIICHI YAMANA | | | | |

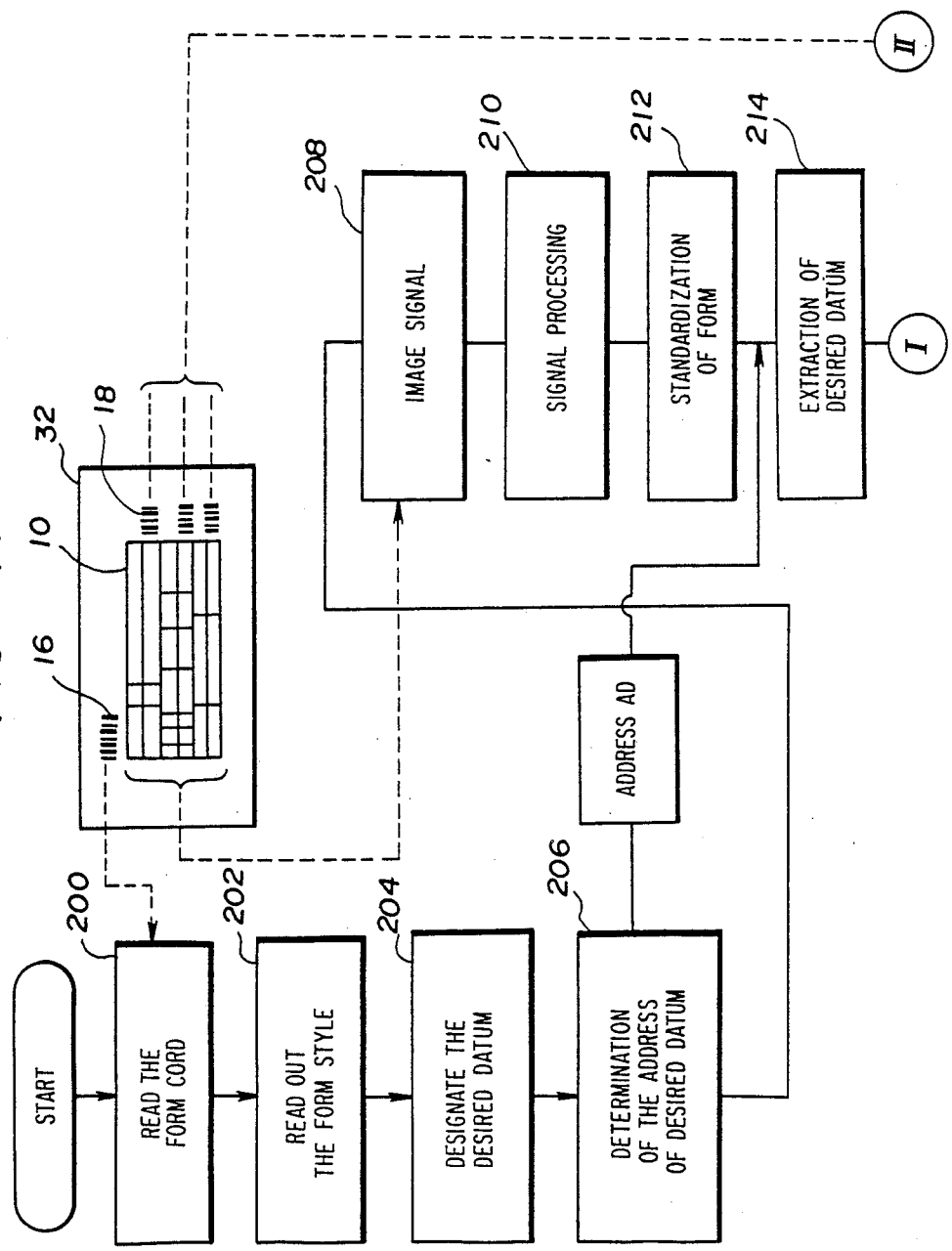

FIG.6

| 記号 | 番号 | 令 | 新契約番号 | |
|---|---|---|---|---|
| 350 | 15 09 22 25 | 34 | 06 40 80 10 01 5 | 05 1 |
| 商品 | 特1 | 特2 | 特3 | 特4 | 特5 |
| 05 | 0900 0500 | 0000 0000 | 0300 0100 |
| 被生年月日 | 保険料 | | |
| 47 04 09 | 13382 | 死亡 | 150000 |
| 契 名 | 被 名 |
| オオツカ シュウイチ | ヤマナ ケイイチ |

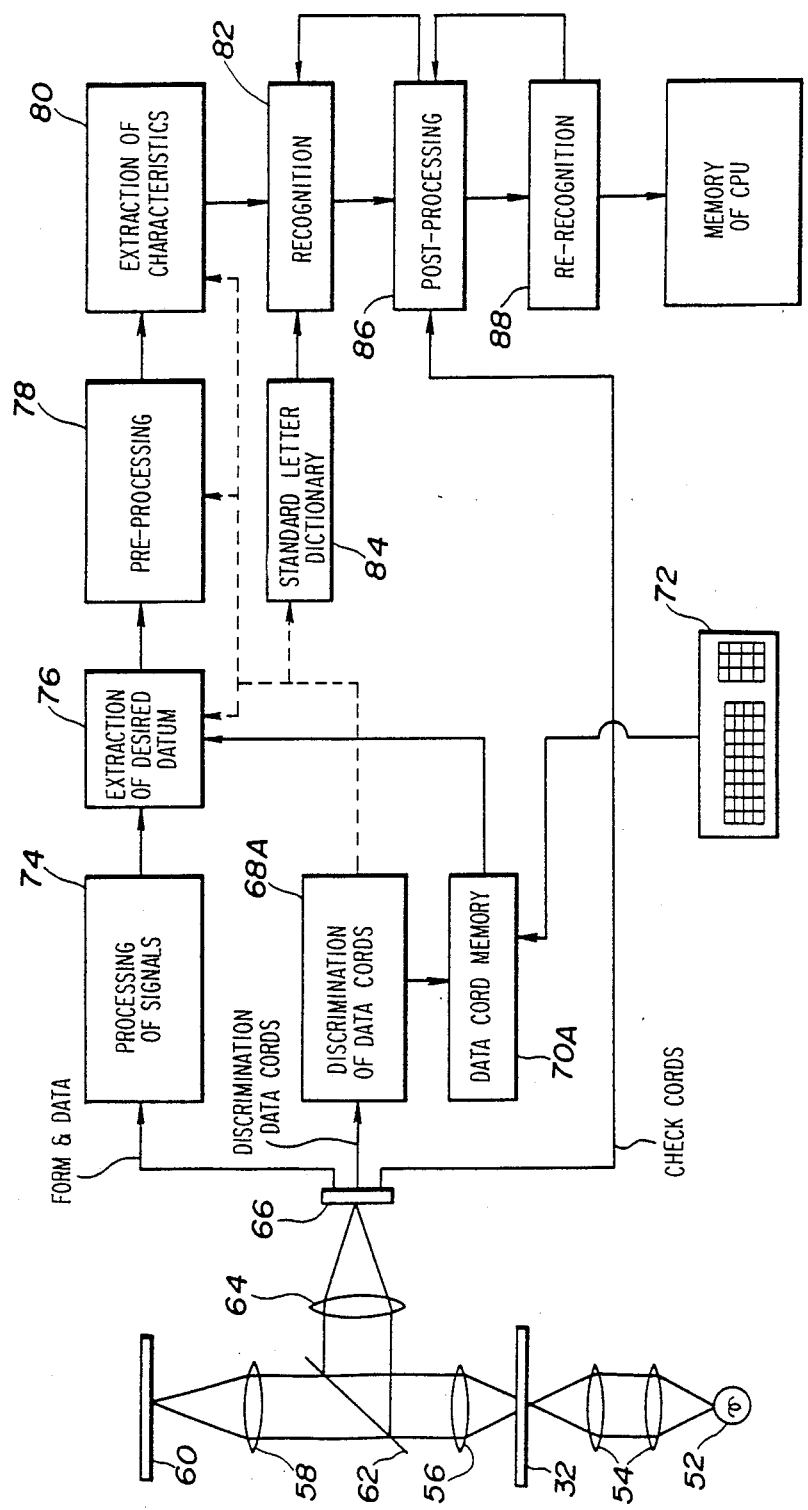

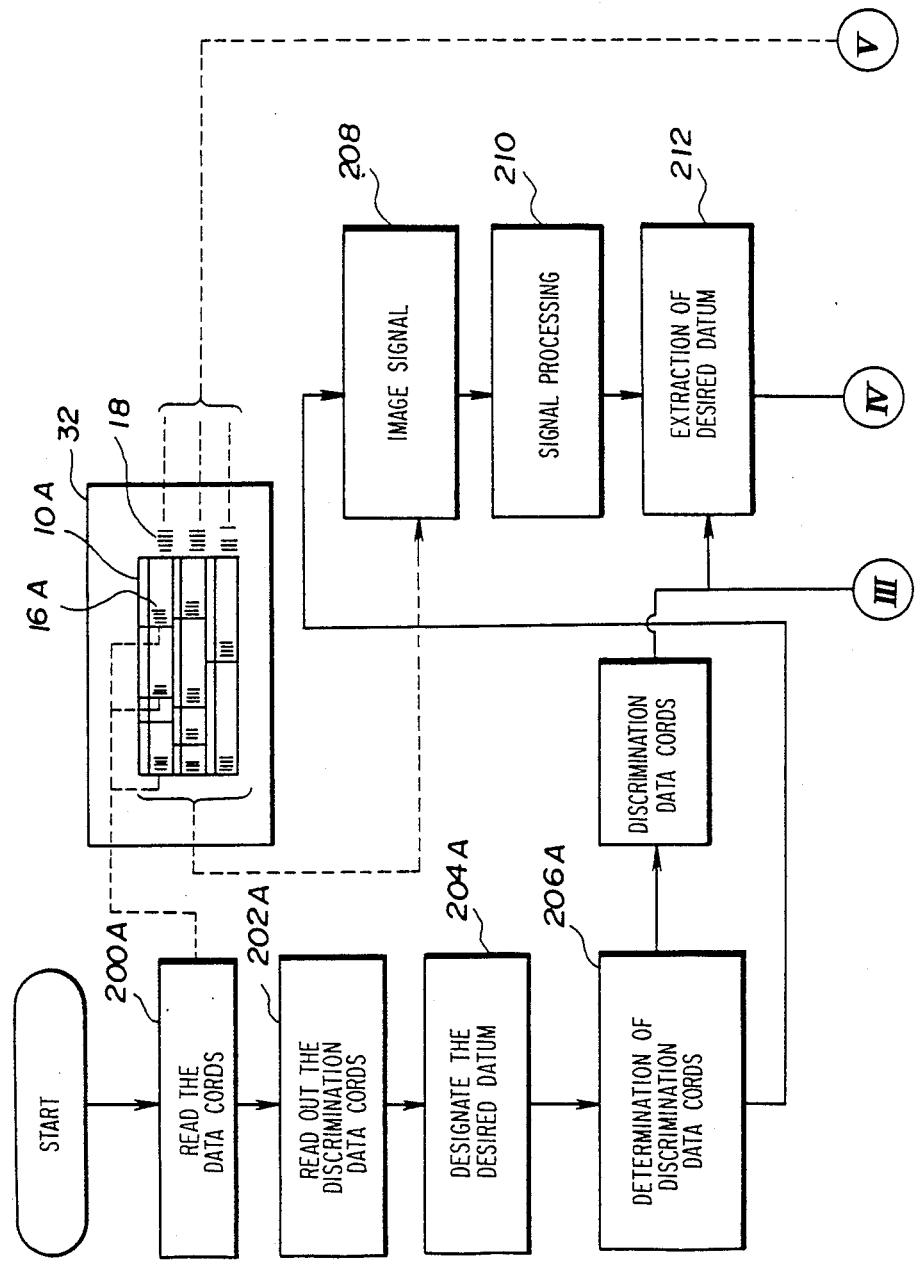

FIG. 10

| 記号 | 番 号 | 令 | 新契約番号 | | |
|---|---|---|---|---|---|
| 350 | 1509225 | 34 | 06408010015 | | 051 |
| 診 | 特1 | 特2 | 特3 | 特4 | 特5 |
| 商品 | 0900 | 0500 | 0000 | 0300 | 100 |
| 05 | 611 | 保険料 | 払料性 | | |
| 被生年月日 | | 13382 | 91 1 | 死亡 S | |
| 400409 | | | | 150000 | |
| 契 名 | | | 被 名 | | |
| オオツカ ショウイチ | | | ヤマナ ケイイチ | | |

SELECTIVE RETRIEVAL OF DATA FROM MICROFILM IMAGES OF DIFFERENT FORMS BY READING A MEMORY INDEX FORM CORD (BAR CODE) RECORDED ON EACH IMAGE FRAME

BACKGROUND OF THE INVENTION

Field of the Invention

The present invention relates to a system for recording and reading an image information wherein an image containing a certain form and data is recorded on each frame of a microfilm and a desired datum is selected and read from the microfilm. The invention further relates to a microfilm, a printer and a reader used in the aforementioned system.

It is a common practice to store informations recorded in a variety of tickets, registers of fixed assets, slips, cards for the management of customers or cards for recording patients comming to a hospital in a computer so that data are put out from the computer and printed on a microfilm in a certain form. However, in the conventional technology, when it is desired to extract a desired datum from an image printed on the microfilm, the image is projected by a reader and the desired datum is read visually by the operator who inputs the datum to the computer through a keyboard. Cumbersome operations are required for reading data from the projected image and to selected the desired darum.

On the other hand, it is possible to read the data recorded on a microfilm by OCR (optical character reader) to input the data into a computer. In such a case, it becomes necessary to discriminate the region in which data are printed and to discriminate the form and partition lines of the form in addition to the discrimination of the sizes of letters, pitches of letters, kinds of letters (Chinese characters or numerals) and founts of letters (Ming's style characters or Gothic style letters). There arises the problem that the operation speed of reading and coding the letters is too low, or that the accuracy in reading operation is lowered.

If the form recorded on the microfilm is fixed, it suffices to read the predetermined position of the microfilm by OCR. However, when image informations are recorded in different forms, a desired datum cannot be read by simply reading the predetermined position of the microfilm by OCR.

OBJECTS AND SUMMARY OF THE INVENTION

Accordingly, a first object of this invention is to provide a system for recording and reading an image information wherein an image containing a certain form and data is recorded on each frame of a microfilm and a desired datum is selected and read from the microfilm effectively and accurately with ease irrespective of the change in form and irrespective of change in kind, size and pitch of letters.

A second object of this invention is to provide a microfilm which is used in such a system.

A third object of this invention is to provide a printer for printing an image information to be used in such a system.

A fourth object of this invention is to provide a reader which is used in such a system.

The first object of this invention is achieved by the provision of a system for recording and reading an image information wherein an image containing a certain form and data is recorded on each frame of a microfilm and a desired datum is selected and read from the microfilm, comprising:

a printer for printing a form cord for discriminating said certain form recorded on each frame of said microfilm; and a reader for reading said form cord and reading-out the corresponding form from a form memory to determine the position of said desired datum so that said desired datum is extracted from the printed image.

It is desirous that the form cord includes the informations relating to the kind, fount, size and pitch of letters in addition to the information relating to the form.

In lieu of the form cord or in addition to the form cord, discrimination data cords necessary for determining the positions of respective data and discriminating respective data may be printed so that a desired datum is extracted by the utilization of the discrimination data cords or the combination of the discrimination data cords and the form cord. The discrimination data cords may be printed collectively at one location or may be printed separately. A discrimination mark indicating the combination of the kind of used form and the discrimination data cord may be printed and read to extract the desired datum.

The second object of this invention is achieved by the provision of a microfilm for use in a system for recording and reading an image information containing a certain form and data, characterized in that each frame of said microfilm is printed with a form cord indicating the style of said form so that the form is discriminated by reading said form cord to enable extraction of one or more data from said image information.

In lieu of or in addition to the form cord, data discrimination cords may be printed or check cords for checking the data may be printed together with said form cord.

The third object of this invention is achieved by the provision of a printer for printing an image information, comprising:

a form memory for storing a plurality of form styles;

a form cord input means for designating the form cord for the used form style;

a cord video signal generator for generating a video signal in response to the designated form cord; and optical means for printing the form cord in response to said video signal on each frame of said microfilm together with said certain form and said data.

In lieu of or in addition to the form cord, data cords may be recorded by the printer.

The fourth object of this invention is achieved by the provision of a reader for selectively reading a desired datum from each frame of a microfilm on which an image information containing a certain form style is recorded together with data, comprising:

a form memory storing a plurality of form styles;

a cord reader for reading the form cord printed on each frame of said microfilm;

a form discriminator for reading out the corresponding form style from said plurality of form styles stored in said form memory based on the form cord read by said cord reader;

input means for designating a desired datum;

a data extracting circuit for extracting said desired datum by determining the position of said desired datum in said form style responsive to the signal from said input means.

In lieu of or in addition to the form cord, data cords may be recorded and read by the system.

A form cord indicating a certain form with or without data discrimination cords for discriminating respective data is printed on each frame of the microfilm. When a desired datum is read from one frame of the microfilm, the form cord and the data discrimination cords are read to know the position of the datum and the kind, fount, size and pitch of letters which are discriminated by referring the read cords with the memory so that the data necessary to extract the desired datum is discriminated. The region in which the desired datum is contained is thus determined, followed by extraction of the desired datum from the image information.

DESCRIPTION OF THE DRAWINGS

FIG. 1 shows an exemplified frame of a microfilm, in which a customer management card is recorded by the system of the invention;

FIG. 1A is English translation of FIG. 1;

FIGS. 5A and 5B are flow charts showing the operation sequence of the reader shown in FIG. 4;

FIG. 6 shows an exemplified frame of a microfilm which is a second embodiment of the invention;

FIG. 8 is a schematic illustration of an image reader used for reading the image on the frame of the microfilm shown in FIG. 6;

FIGS. 9A and 9B are flow charts showing the operation sequence of the reader shown in FIG. 8;

FIGS. 10 and 11 show further exemplified frames of a microfilms;

PREFERRED EMBODIMENTS OF THE INVENTION

The present invention will now be described in detail with reference to some embodiments thereof. Initially referring to FIGS. 1 to 5, a first embodiment using a form cord and check cords will be described.

In each frame of the microfilm, an image of a card shown in FIG. 1 is printed. As shown in FIG. 1, a form 10 includes a number of columns defined by traverse and cross partition lines, wherein various clauses are printed in the odd lines 12 (1st, 3rd, 5th and 7th lines). Data corresponding to respective clauses are printed in the even lines 14. In this embodiment, a form cord 16 indicating the form style is printed at the upper left margin of the form 10. The form cord 16 is a bar cord. Check cords 18 in the form of bar cords are printed in the right margins of respective columns 14. Data printed in the card shown in FIG. 1 are numerals and the letters in the square form of KANA. However, name and residence of the customer may be printed by Chinese letters.

Figure 2:
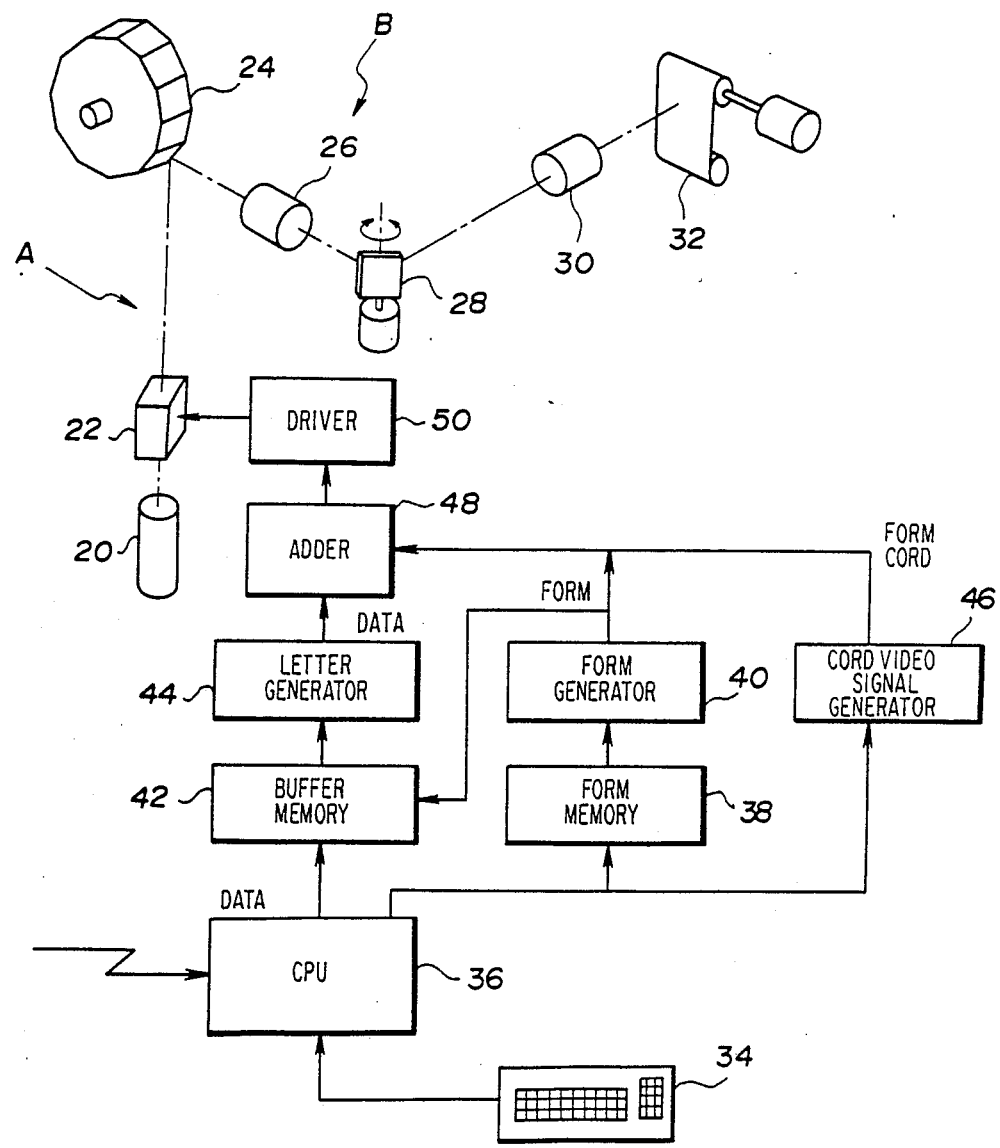
FIG. 2 is a schematic illustration showing an embodiment of the printer of the system for recording and reading an image information according to the invention.

The image shown in FIG. 1 is recorded on a microfilm using the image information printer shown in FIG. 2. In FIG. 2, an optical system is generally denoted by A and comprises a laser beam source 20, such as an argon laser beam source, a photo-modulator 22, a rotary polygonal mirror 24, a lens 26, a galvanometer mirror 28 and a lens 30. Reference numeral 32 designates a microfische film. The light beam emitted from the laser beam source 20 is on-off modulated by the photo-modulator 22, and scanned in the main scanning direction (horizontal scanning direction) by the reflection surfaces of the rotary polygonal mirror 24. The laser beam reflected by the rotary polygonal mirror 24 is passed through the lens 26 to the galvanometer mirror 28. The galvanometer mirror 28 receives the laser beam reflected by the rotary polygonal mirror 24 so that the laser beam scanns in the subsidiary scanning direction (vertical scanning direction). A scanning system B is constituted of the rotary polygonal mirror 24 and the galvanometer mirror 28. As the result, the laser beam passing through the lens 30 and focused on the film 32 scans the film 32 in the two dimensional directions to effect raster scanning.

The the style of the form 10, the cord and data printed on the microfilm 32 are instructed through a keyboard 34 as form cord input means. The data may be put out from a memory (not shown) contained in a computer (hereinafter referred to as CPU) 36 or may be put out directly through the keyboard 34.

The cord indicating the form 10 is put into a form memory 38 storing various different styles of form 10, so that a corresponding form 10 is selected from the sotred form styles in the form memory 38 when the form cord is read by the reader. Upon reading of the form cord, a form video signal is put out from a form generator 40.

On the other hand, the desired datum designated through the keyboard 34 is transferred to a buffer memory 42 at a predetermined timing so that a datum video signal is generated from a letter generator 44. A code video signal generator 46 generates a form cord video signal for producing a form cord 16 (see FIG. 1) and check cord video signals for producing check cords 18 (see FIG. 1). The form video signal, the data video signals, form cord video signal and check cord video signals are added by an adder circuit 48, and a driver 50 controls the photo-modulator 22 based on the added signals. The rotary polygonal mirror 24, the galvanometer mirror 28, the form generator 40, the letter generator 44 and the cord generator 46 are controlled by the CPU 36 so that the video signals from these generators 40, 44 and 46 are passed through the adder circuit 48 to control the photo-modulator 22 to be on or off corresponding to the position on the film 32 scanned by the laser beam. As the result, predetermined data are printed in corresponding columns of the form 10 and the form cord 16 and the check cords 18 are printed at the predetermined positions on the film 32, as shown in FIG. 1.

Although the keyboard 34 is used as the form cord input means for designating the form in the aforementioned embodiment, the CPU 36 may be used to operate a certain program to designate the form or other form cord designating means may be used within the scope of this invention.

Figure 3:
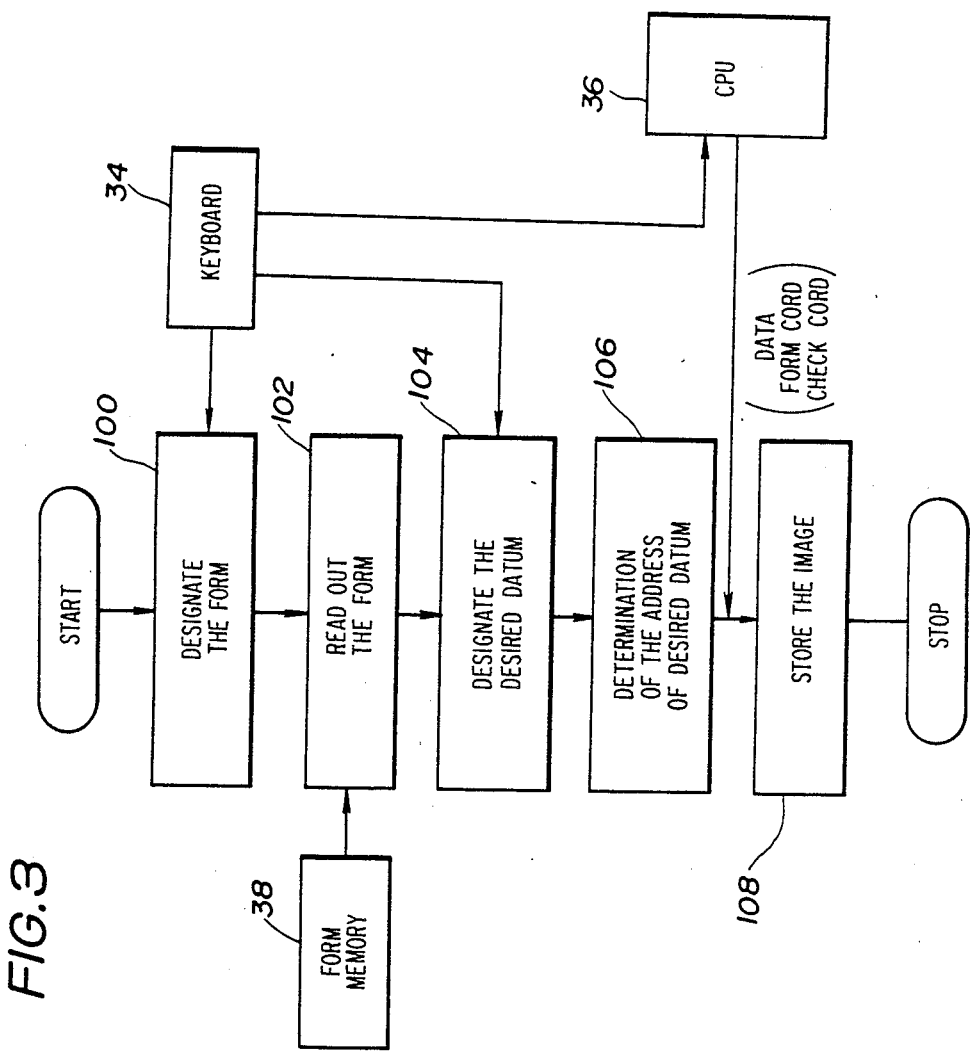
FIG. 3 is a flow chart showing the operation sequence of the printer of FIG. 2.

An image is printed through the operation sequence as shown in FIG. 3. As a certain form 10 is designated through the keyboard 34 (Step 100), the designated form 10 is read from the form memory 38 (Step 102). Respective data designated through the keyboard 34 are put directly from the keyboard 34 or read from the memory of the CPU 36, and the sorts of respective data are put from the keyboard 34 (Step 104). Since the address at which each datum is recorded is changed by the used form 10, the address of each datum should be determined depending on the used form 10 (Step 106). By generating the video signals at respective locations (addresses) on the film 32, the form, the data, the form cord and the check cords are printed correspondingly (Step 108).

An image reader for reading a desired datum from the printed image information on each frame of the microfische film 32 will be described with reference to FIGS. 4 and 5.

Figure 4:
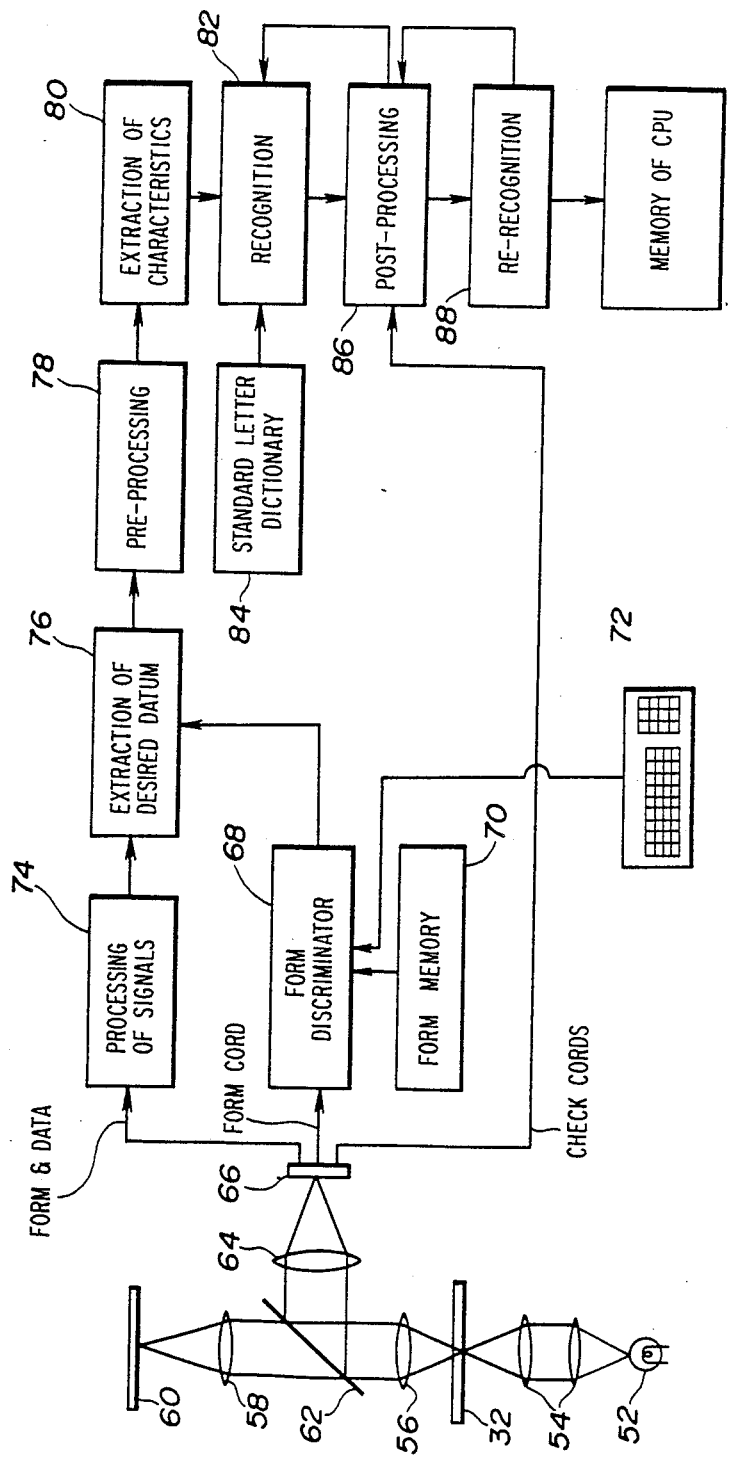
FIG. 4 is a schematic illustration of an embodiment of the reader for reading the image recorded on an microfilm.
Figure 5B:
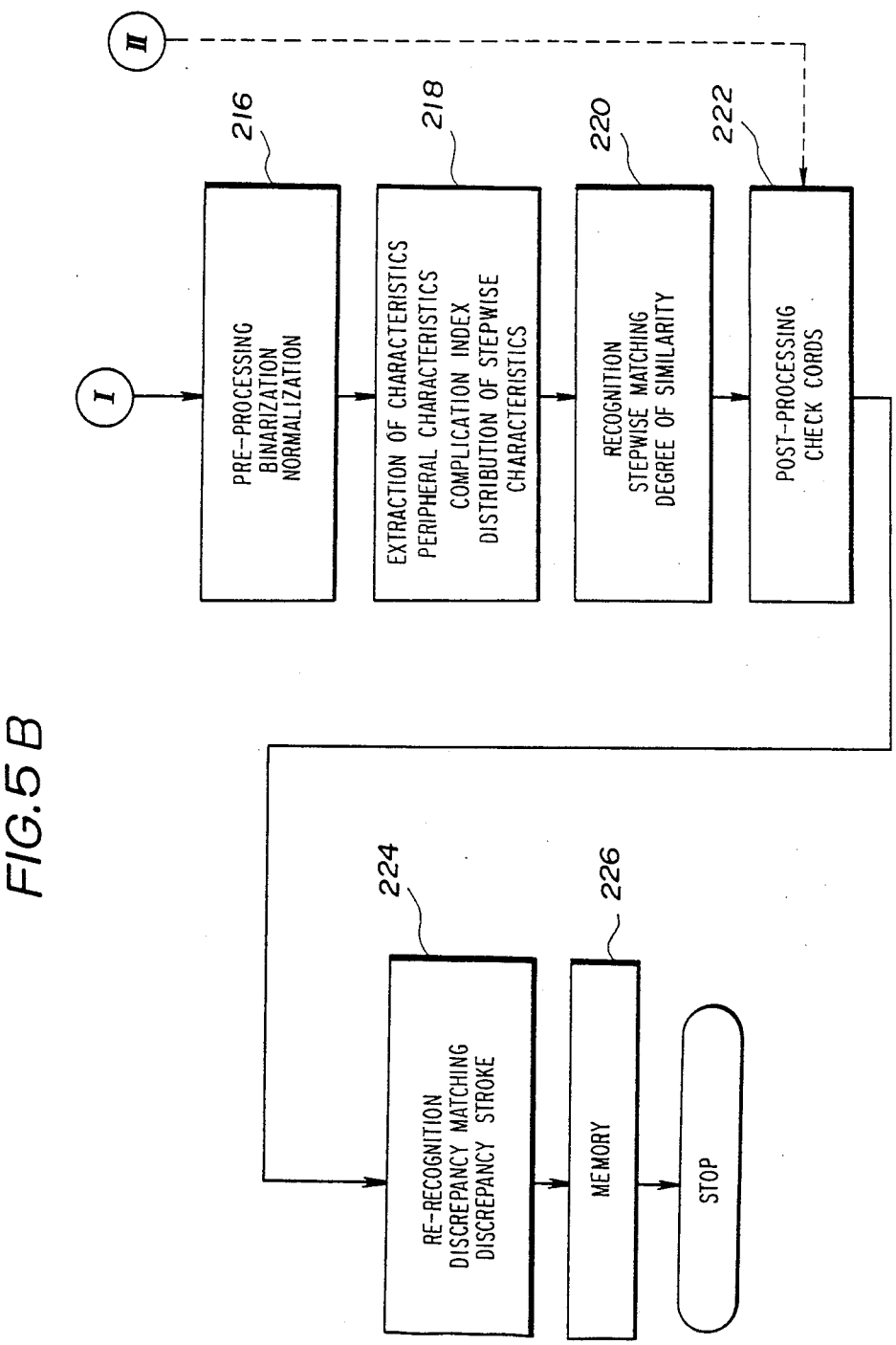

In FIG. 4, reference numeral 52 designates a light source and reference numeral 54 designates a condenser lens. The light generated from the light source 52 is passed through the condenser lens 54 to the microfische film 32. The light transmitting through the film 32 is passed through a projection lens 56 and a focusing lens 58 to a screen 60 which can be visually observed. A portion of the light transmitting through the film 32 is reflected by a half-mirror 62 to be focused on an image sensor 66 through a focusing lens 64. The image sensor 66 may be a unidimensional line sensor which is moved along the direction perpendicular to the lengthwise direction thereof, or a two-dimensional area sensor.

The output signal from the image sensor 66 contains all of the image information, as shown in FIG. 1. Initially, the form cord 16 indicating the style of the used form 10 is read (Step 200 shown in FIG. 5), and the form cord is put in a form discriminator 68. The form discriminator 68 read out the indicated form 10 (Step 202) from a form memory 70 (which may be the form memory 38 as used in the printer described above) to know the address of the desired datum, i.e. the position of the desired datum in the printed image. The kind of the desired datum contained in the form 10 is instructed through a keyboard 72 as input means for designating the desired datum (which may be the keyboard 34 as used in the printer described above) (Step 204), whereupon an address signal AD of the desired datum is put in a datum extraction circuit 76 (Step 206) which will be described in detail herainafter. The form cord 16 is printed at a predetermined location spaced from the form 10 by a predetermined distance, and thus the form cord 16 can be discriminated by reading the output of a predetermined location from the image sensor 66.

The analog image output of the image sensor 66, namely the image containing the form 10 and data, is put into a signal processing circuit 74 (Step 208) where it is subjected to amplification, shaping, correction of shading and other analog processings (Step 210). A desired datum is extracted from the thus processed image signal by the datum extraction circuit 76. In order to fixedly determine the address of the desired datum by the form discriminator 68, it is essential that the size of the image received by the image sensor 66 is standardized. Accordingly, the image signal is standardized so that the image has a constant size (Step 212). The size of the image may be detected by sensing the two diagonal corners or by measuring the lengths of the crossing two sides of the form 10. The thus standardized image signal is fed to the datum extraction circuit 76 where a desired datum is extracted (Step 214).

When the desired datum is extracted, the image signal corresponding to the desired datum is recognized through the known image recognition process so that the letters or numerals on the microfilm is coded and put in the memory or CPU.

The image recognition process may be effected as follows. Each of the letters contained in the datum is extracted by a pre-processing circuit 78, and the image signal of each letter is rotated, enlarged or reduced to be normalized, and then binarized to be converted into a digital signal (Step 216). The defects of each-letter are corrected by repairment, such as slenderization, to be easily recognized.

After the pre-processing step, the characteristics of the image (letter) is extracted by a characteristics extraction circuit 80 (Step 218), and the letter is recognized by a recognition circuit 82 (Step 220). Extraction of characteristics of each letter may be effected by various methods. For example, the letter may be roughly classified by discriminating the peripheral portions of the letter pattern, followed by fine classification of resembling letters, to recognize a certain letter. One example of the peripheral portion discrimination method is a four side cording method wherein a slit-shape window is disposed along each of the four sides of the letter and the number of dots contained in each window is checked and coded. Alternatively, a Chinese letter may be recognized by the use of the pheripheral characteristics, wherein the distance from the periphery to the portion at which the dot showing the existence of letter line is present is measured.

Otherwise, the letters may be classified by the complication indices along the horizontal and vertical directions, classified by the stroke densities of respective letters, or classified by the stroke distribution method wherein the projections of letter patterns on the coordinate axes are determined and the characteristics of the waves of the intensity distribution are utilized to identify the letters.

The letters may be roughly classified by extracting the characteristics of relatively low order to narrow the candidates for the specific letter to several tens to several hundreds, and then the specific letter is identified through a method of higher order (Step 82). For example, when the letter is a Chinese letter, in view of the fact that each Chinese letter is formed of a left-hand radical and a right-hand radial, a stepwise structural analysis or stepwise matching process, wherein pattern matching operations are repeated stepwisely, may be utilized. At the first step of this process, a letter pattern formed by 32×32 picture elements is converted to a four bit pattern of 4×4 picture elements, and the four bit letter pattern is compared to the letter patterns in a standard letter dictionary 84 to narrow the candidates for the specific letter. Then, at the second step, the tone of the letter pattern is converted to four bit pattern of 8×8 picture elements and compared to the letter patterns in the standard letter dictionary 84. Similar matching trials are repeated stepwisely to identify the specific letter.

A quantitative method may also be utilized, in which the degree of dislocation of the read-out letter pattern from the standard letter pattern contained in the dictionary is quantitatively determined by the factor of "distance" or "degree of similarity".

Anyway, after the completion of recognition of read letter, a post-processing by a post-processing circuit 86 follows (Step 222). At this step, it is ascertained that the recognition of letter is correct by the use of the check cords 18 read by the image sensor 66. For instance, the letters contained in one line 14 of the form 10 are checked at this step. The check cords may be attached for every bits of letters, or may be attached to respective clauses. Different check cords may be selected from the known system and used in combination. Each check cord may be in the form of a parity check cord having the total value of odd number. When it is ascertined that the letters are recognized incorrectively, the image is discriminated again by a re-discrimination circuit so that the image is discriminated by an image discriminating method of higher order. Methods which may be used for this purpose include a discrepancy matching method in which metching is examined by emphasizing the discrepancy between resembling letters, and a discrepancy stroke discrimination method in which the difference in stroke of resembling letters is examined.

If anyone of the read letters cannot be identified by the step of recognizing the letters, such a letter may be identified by selecting from plural letters having highest probability by referring to the check cord.

Upon completion of correct recognition of letters, the data are codified and stored in the memory of CPU (Step 226). These data may be transferred to a CPU of on-line connection or to another CPU of off-line connection.

Although the functions of printing and reading the image have been described separately with reference to FIGS. 2 and 4 in the aforementioned description, a portion or all of these functions may be achieved by the CPU.

Although the position or address of the desired datum is determined by the form cord in the illustrated embodiment, the kind (alphabets, numerals or other kinds of letters), size and fount of letters may be recognized by reading the form cord so that the accuracy in recognition of the image can be further improved.

The form cord 16 used in the embodiment shown in FIG. 1 is a unidimensional bar cord, the form cord may be two-dimensional bar cord or other form. Although it is desirous that the form cord is printed in a simple pattern which can be recognized without the need of complicated pattern recognition, numerals or other simple letters may be used.

Figure 7:
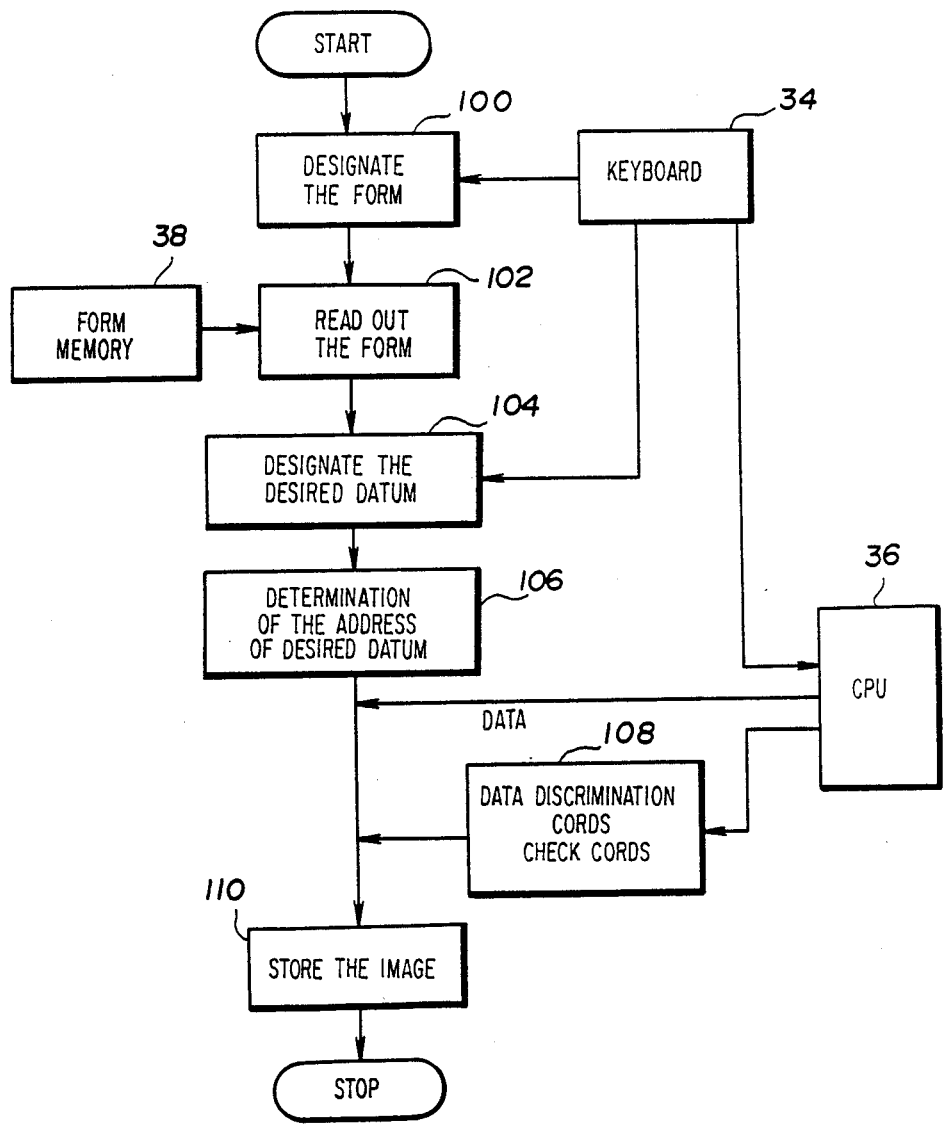
FIG. 7 is a flow chart showing the operation sequence of the system which is the second embodiment of the reader according to the invention.
Figure 9B:
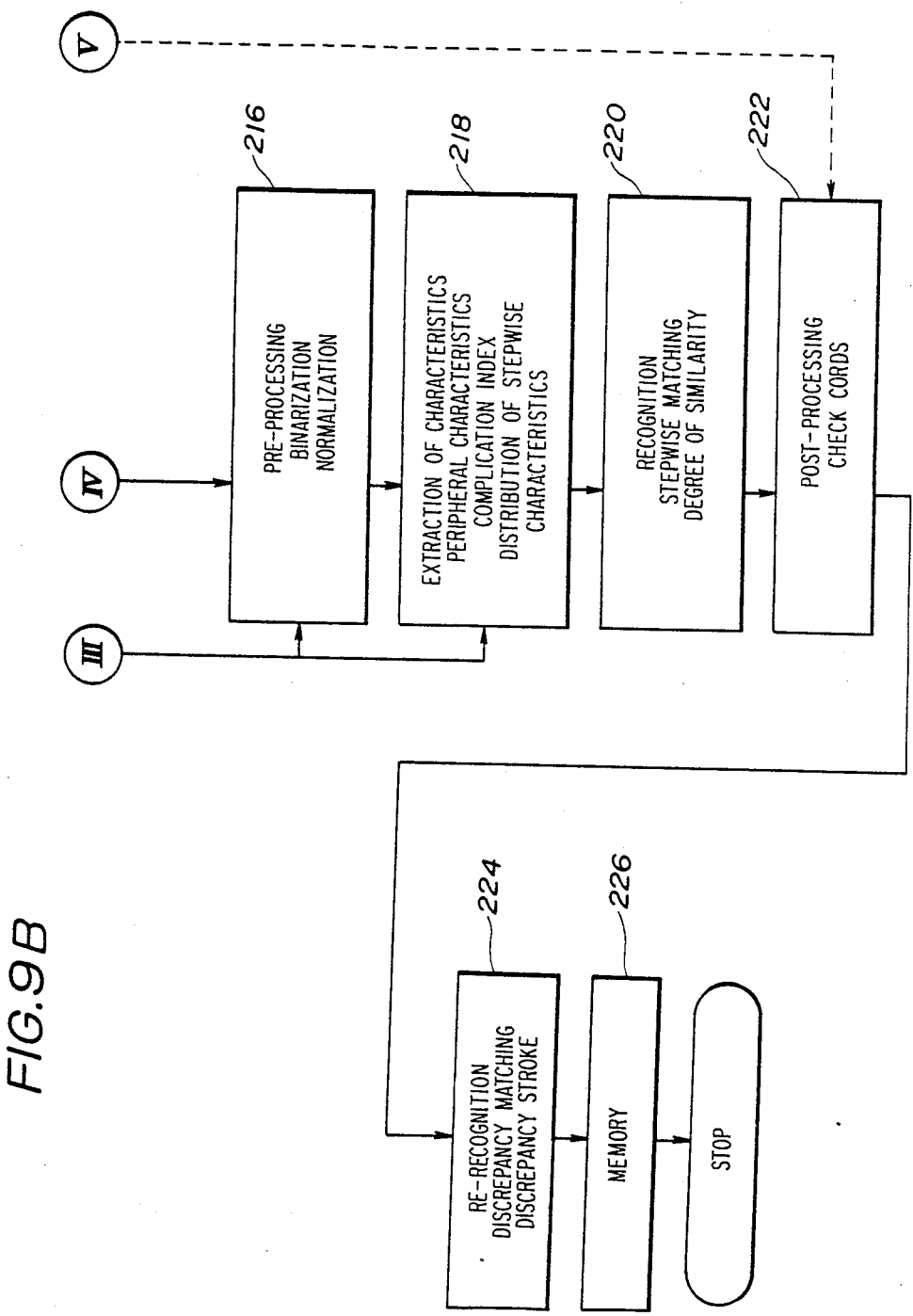

FIG. 6 shows an exemplified frame of a microfilm which is a second embodiment of the invention; FIG. 7 is a flow chart showing the operation sequence of the system which is the second embodiment of the reader according to the invention; FIG. 8 is a schematic illustration of an image reader used for reading the image on the frame of the microfilm shown in FIG. 6; and FIG. 9 is a flow chart showing the operation sequence of the reader shown in FIG. 8.

The form 10A of the second embodiment is attached with data cords (discrimination data cords) 16A for discriminating respective data to show the kinds, sizes, pitches and founts of letters at predetermined positions in the form 10A. In the illustrated embodiment, the data cords 16A are attached to the upper left shoulder of respective data in the form of bar cords.

The image shown in FIG. 6 is printed on a frame of a microfilm using the printer shown in FIG. 2. The video signal generator 46 shown in FIG. 2 generates data discrimination cord video signals showing the discrimination data cords in stead of the form cord video signal. The operation sequence for printing the image is shown in FIG. 7. The flow chart shown in FIG. 7 is similar to that shown in FIG. 3 except the Step 108. At the Step 108, discrimination data cords are printed in place of the form cord. The other Steps of the operation sequence are identical with those shown in FIG. 3, and the description thereof will not be repeated here.

In a reader of this embodiment, the output signal from the image sensor 66 includes the signal of the overall image shown in FIG. 6. Only the data cords 16A showing the positions and the kinds of the data are read and discriminated by a discriminator 68A shown in FIG. 8 at the Step 200A (see FIG. 9). The positions (addresses) of respective data and the kinds, sizes, founts and pitches of letters are discriminted (Step 202A) and stored in a memory 70A. A desired datum contained in the form 10A is designated through a keyboard 72 (which may be the same as the keyboard 34 of the recorder) at the Step 204A, and the data cord 16A necessary for the discrimination of the desired datum is put out from a datum extraction circuit 76 and passed to a pre-processing circuit 78, a characteristics extraction circuit 80 and a standard letter dictionary 84 (Step 206A).

The analog image output from the image sensor 66 containing the form signal 10A and data signals is fed to a signal processing circuit 74 (Step 208) where it is subjected to analog processings including amplification, shaping and correction of shading (Step 210). A signal of the desired datum is extracted from the thus processed image signal by a datum extraction circuit 76 (Step 212).

After the desired datum is extracted, the image of the datum is recognized similarly as in the preceding embodiment so that the datum in the form of letters and/or numerals on the microfilm is corded and fed to the memory of the CPU.

The process of recognizing the image is similar to that in the preceding embodiment, and the description thereof will not be repeated.

In the embodiment shown in FIGS. 6 to 9, the data cords 16A for discriminating the area of respective data and the kinds, sizes and pitches of letters are arranged in front of the data. However, the data cords may be arranged at any locations as far as they are arranged in predetermined interrelation with respective data.

Although the data cords 16A are selectively read from the image containing the form 10A and data in the illustrated embodiment, a form cord may be printed at a predetermined location of the image so that the form cord is initially read to discriminate the used form style, and the image signal of the form is subtracted from the overall image signal to display the image containing the data cords and data, and the data discrimination cords 16A are read from the thus displayed image.

The data cords for discriminating respective data are individually printed at separate locations in the illustrated embodiment. However, within the scope of the invention, the data cords may be printed collectively at a single location. Alternatively, discrimination data for discriminating the combinations of form styles and kinds of letters used to show the data may be stored in a separate memory, and the discrimination marks are attached to respective data in the image so that the combination of the used form style and the discrimination data is read out by referring to the memory.

FIG. 10 shows an embodiment in which discrimination data cords are printed collectively at a single position in the image. Reference numeral 16B designates a bar cord which is read to discriminate the positions of respective data and the kinds, sizes, pitches and founts of letters. The reader used for reading the embodiment of FIG. 10 has the construction similar to that shown in FIG. 8. The discrimination data cord 16B read from the image is fed to a discriminator 68A which discriminates the content of data cord 16B, and the content of data cord 16B is stored in a memory 70A.

Figure 11:
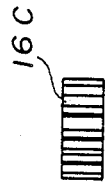
Figure 12:
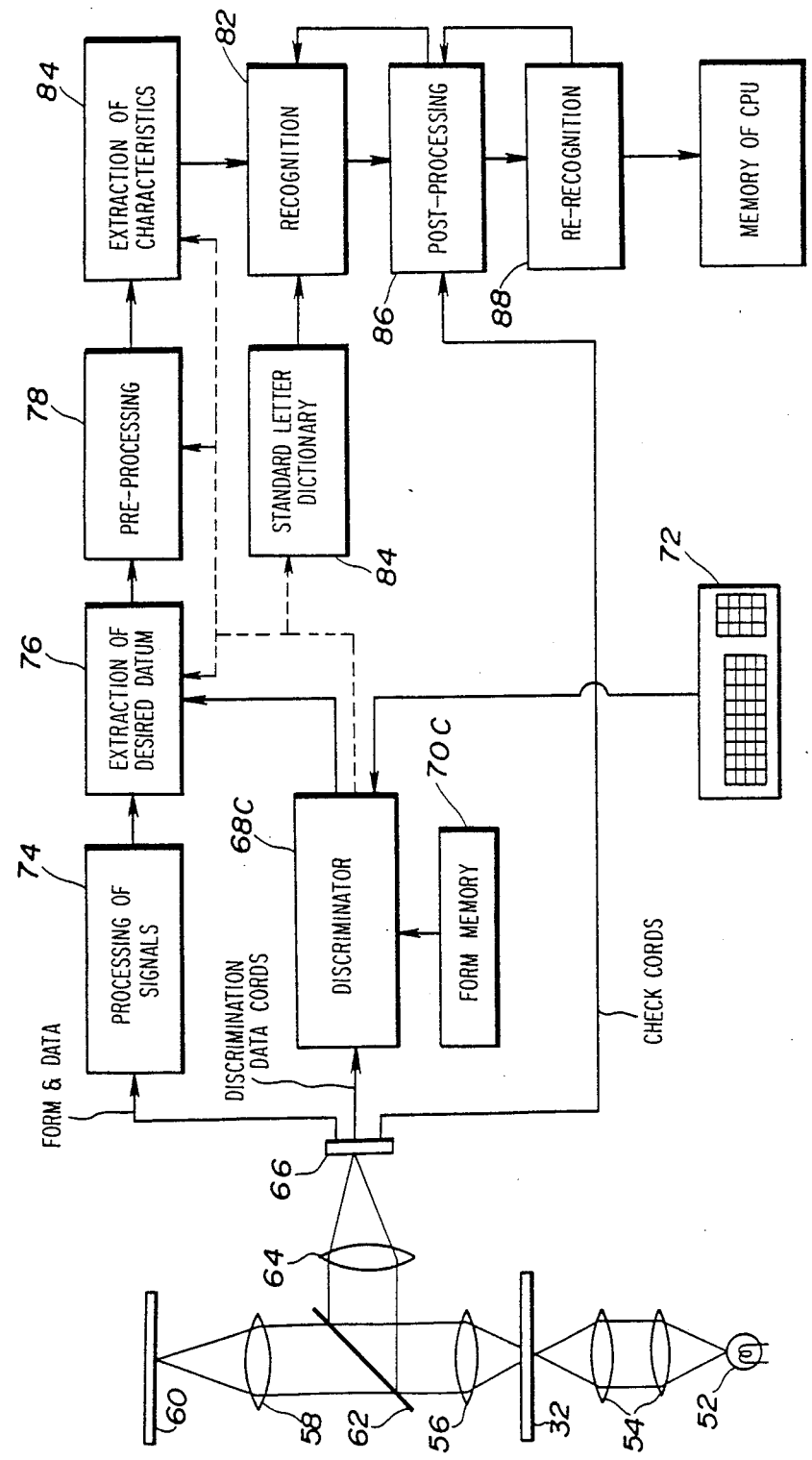
FIG. 12 is a schematic illustration showing another embodiment of the reader for reading the image of FIG. 11.

When discrimination data cords showing various combinations of the form styles, arrangements of data, kinds, sizes, founts and pitches of used letters are stored in a separate memory, a distinction mark 16C is printed in the image as shown in FIG. 11 so that a specific combination of the discrimination data is read out from the memory. FIG. 12 shows a reader used to read the data, wherein numeral 70C designates a memory in which discrimination data showing various combinations are stored. Depending on the distinction mark 16C read from the image, a discriminator 68C reads out a specific discrimiantion datum from the memory 70C and the area of a desired datum is extracted and passed to the data extraction circuit 76. The following operations are similar to those as shown in FIGS. 4 and 8, and the description thereof will not be repeated.

According to the first invention, a form cord is printed on each frame of a microfilm together with the data and the form by means of a video signal of the form cord put through a keyboard or like means. Accordingly, when it is desired to read a certain datum selectively, the position (address) of the desired datum can be easily discriminated. The same functional effect may be attained by the provision of data discrimination cords in lieu of or in addition to the form cord, or a distinction mark showing the combination of the used form style and the used letters may be printed on each frame of the microfilm. The desired datum can be easily read with high efficiency.

A microfilm used in the first invention is provided according to the second invention, and a printer and a reader used in the system of the first invention are provided according to the third and fourth inventions.

What is claimed is:

1. A system for recording and reading an image information wherein an image containing a certain form and data is recorded on each frame of a microfilm and a desired datum is selected and read from the microfilm, comprising:
    a printer for printing a form cord for discriminating said certain form recorded on each frame of said microfilm; and
    a reader for reading said form cord and reading-out the corresponding form from a form memory to determine the position of said desired datum so that said desired datum is extracted from the printed image.

2. The system as claimed in claim 1, wherein said form cord includes information indicating the form style and an information relating to at least one of the kind of letters, the fount of letters, the size of letters and pitch of letters.

3. A microfilm for use in a system for recording and reading image information containing a certain form and data, characterized in that each frame of said microfilm is printed with a form cord indicating the style of said form so that the form is discriminated by reading said form cord to enable extraction of one or more data from said image information.

4. The microfilm as claimed in claim 3, wherein check cords for checking the data are printed together with said form cord.

5. A printer for printing image information, comprising:
    a form memory for storing a plurality of form styles;
    form cord input means for designating the form cord for the used form style;
    a cord video signal generator for generating a video signal in response to the designated form cord; and
    optical means for printing the form cord in response to said video signal on each frame of said microfilm together with said certain form and said data.

6. The printer as claimed in claim 5, wherein said cord video signal generator generates a video signal relating to a form cord and a video signal relating to check cords for checking data so that said form cord and said check cords are printed on each frame of said microfilm together with said certain form and said data.

7. The printer as claimed in claim 5, comprising a laser beam source, a photo-modulator for modulating the laser beam emitted from said laser beam source, and scanning means including a rotary polygonal mirror and a galvanometer mirror for passing the modulated laser beam to said microfilm.

8. The printer as claimed in claim 7, wherein said photo-modulator is driven by an added signal obtained by adding an output of letter signals generated from a letter signal generator generating letter signals corresponding to the stored data, an output from a form signal generator for generating said form signal read out from said form memory and an output from said form video signal generator for generating said video signal in response to said form cord.

9. A reader for selectively reading a desired datum from each frame of a microfilm on which image information containing a certain form style is recorded together with data, comprising:
    a form memory storing a plurality of form styles;
    a cord reader for reading the form cord printed on each frame of said microfilm;
    a form discriminator for reading out the corresponding form style from said plurality of form styles stored in said form memory based on the form cord read by said cord reader;
    input means for designating a desired datum;
    a data extracting circuit for extracting said desired datum by determining the position of said desired datum in said form style responsive to the signal from said input means.

10. The reader as claimed in claim 9, wherein said cord reader read the check cords, in addition to the form cord, so as to check the data to be read thereby.

11. A system for recording and reading image information wherein an image containing a certain form and data is recorded on each frame of a microfilm and a desired datum is selected and read from the microfilm, comprising:
    a printer for printing data discrimination cords necessary for determining the position of respective data and for discriminating respective data; and
    a reader for reading said discrimination data cords so that said desired datum is extracted from the printed image.

12. The system as claimed in claim 11, wherein each of said data discrimination cords includes information indicating the position and kind of datum and an information relating to at least one of the kind of letters, the fount of letters, the size of letters and pitch of letters.

13. The system as claimed in claim 11, wherein said data discrimination cords are attached to respective data.

14. The system for recording and reading image information as claimed in claim 11, wherein said data discrimination cords are printed collectively at a single location.

15. A microfilm for use in a system for recording and reading image information containing a certain form and data, characterized in that each frame of said microfilm is printed with a data discrimination cord for discriminating the contained data so that desired one or more data are extracted by reading said discrimination data cord.

16. The microfilm as claimed in claim 15, wherein check cords for checking the data are printed together with said data discrimination cord.

17. The microfilm as claimed in claim 15, wherein said data discrimination cords are attached to respective data.

18. The microfilm as claimed in claim 15, wherein said data discrimination cords are printed collectively at a single location.

19. A printer for printing a certain form and data on each frame of a microfilm, comprising:
- a form memory for storing a plurality of form styles;
- form cord input means for designating the form cord for the used form style;
- a data cord video signal generator for generating a data cord video signal indicating data cords to be printed in the designated form in response to the respective data; and
- optical means for printing the data discrimination cord in response to said data cord video signal together with the form and the data.

20. A reader for selectively reading one or more desired data from each frame of a microfilm on which a certain form and data are recorded, comprising:
- means for reading discrimination data cords for discriminating the data recorded on said each frame of said microfilm;
- a discriminator for discriminating data by means of said discrimination data cords;
- input means for designating a desired datum;
- a data extracting circuit for extracting said desired datum from each frame of a microfilm in response to an output from said discriminator.

21. A system for recording and reading an image information wherein an image information containing a certain form and data is recorded on each frame of a microfilm and a desired datum is selected and read from each frame of said microfilm, comprising:
- a printer for printing a form cord for discriminating said certain form recorded on each frame of said microfilm and for printing a data discrimination cord for discriminating respective data; and
- a reader for reading said form cord and said data discrimination cord and reading-out the corresponding form from a form memory to subtract the form from the image information and to determine the position of a desired datum with reference to the data discrimination cord so that said desired datum is extracted from the printed image.

22. A system for recording and reading an image information wherein an image containing a certain form and data is recorded on each frame of a microfilm, comprising:
- a printer for printing a discrimination mark on each frame of said microfilm, said discrimination mark indicating the form style and containing cord for discriminating respective data; and
- a reader for reading said discrimination mark to discriminate said form style and said cord for discriminating respective data so that a desired datum is extracted from the printed image.

* * * * *